United States Patent
Ni et al.

(10) Patent No.: US 10,506,030 B2
(45) Date of Patent: Dec. 10, 2019

(54) BALANCING CPU UTILIZATION IN A MASSIVELY PARALLEL PROCESSING HETEROGENEOUS CLUSTER

(71) Applicant: Futurewei Technologies, Inc., Plano, TX (US)

(72) Inventors: Demai Ni, Danville, CA (US); Mingyi Zhang, Santa Clara, CA (US); Le Cai, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 260 days.

(21) Appl. No.: 15/612,747

(22) Filed: Jun. 2, 2017

(65) Prior Publication Data

US 2018/0352024 A1 Dec. 6, 2018

(51) Int. Cl.
*H04L 29/08* (2006.01)
*G06F 9/00* (2006.01)
*G06F 11/00* (2006.01)

(52) U.S. Cl.
CPC .......... *H04L 67/1029* (2013.01); *G06F 9/00* (2013.01); *G06F 11/00* (2013.01); *H04L 67/1008* (2013.01); *H04L 67/1023* (2013.01)

(58) Field of Classification Search
CPC .................. H04L 67/1029; H04L 67/1012
See application file for complete search history.

(56) References Cited

U.S. PATENT DOCUMENTS

| | | | |
|---|---|---|---|
| 7,627,671 B1 | 12/2009 | Palma et al. | |
| 2008/0195755 A1 | 8/2008 | Lu et al. | |
| 2009/0070771 A1* | 3/2009 | Yuyitung | G06Q 10/06 718/105 |
| 2010/0036951 A1 | 2/2010 | Kamath et al. | |

(Continued)

OTHER PUBLICATIONS

Xie et al., "Improving MapReduce performance through data placement in heterogeneous Hadoop clusters", Parallel & Distributed Processing, Workshops and PHD Forum (IPDPSW), 2010, IEEE, International Symposium on, IEEE, Piscataway, NJ, USA, Apr. 19, 2010 pp. 1-9, XP001680250, ISSBN: 978-1-4244-6533-0. (Year: 2010).*

(Continued)

*Primary Examiner* — Nicholas R Taylor
*Assistant Examiner* — Sanjoy Roy
(74) *Attorney, Agent, or Firm* — Conley Rose, P.C.

(57) ABSTRACT

A system (and associated method) includes a processor which determines a performance metric ratio of a performance metric of a second type of server relative to a performance metric of a first server type for each of multiple sizes of multiple benchmark datasets to thereby determine a plurality of performance metric ratio values. The processor also determines an interpolation function for the plurality of performance metric ratio values usable to compute interpolation performance metric ratios of the second type of server relative to the first type of server for dataset sizes other than the first plurality of sizes. Given a second dataset, the processor determines an amount of the second dataset to provide to each of the respective server types using the (Continued)

interpolation function. The processor configures a load balancer based on the amount of the second dataset determined for each type of server.

20 Claims, 3 Drawing Sheets

(56) References Cited

U.S. PATENT DOCUMENTS

| | | | | | |
|---|---|---|---|---|---|
| 2010/0287019 | A1* | 11/2010 | Guo | ................... | G06F 11/3442 |
| | | | | | 709/224 |
| 2011/0276982 | A1* | 11/2011 | Nakayama | .............. | G06F 9/505 |
| | | | | | 718/105 |
| 2012/0221585 | A1* | 8/2012 | Williamson | .......... | G06F 16/258 |
| | | | | | 707/756 |
| 2012/0222042 | A1* | 8/2012 | Chess | .................... | G06F 9/505 |
| | | | | | 718/105 |
| 2012/0290582 | A1* | 11/2012 | Oikarinen | ............... | G06F 16/21 |
| | | | | | 707/741 |
| 2014/0173623 | A1 | 6/2014 | Chang et al. | | |
| 2014/0267571 | A1 | 9/2014 | Periyannan et al. | | |
| 2015/0324221 | A1* | 11/2015 | Chen | ....................... | G06F 17/18 |
| | | | | | 718/102 |
| 2016/0179891 | A1* | 6/2016 | Bowman | ............. | G06F 16/9027 |
| | | | | | 707/720 |

OTHER PUBLICATIONS

Thanopoulou, et al., "Benchmarking with TPC-H on Off-the-Shelf Hardware: An Experiments Report," Conference https://www.researchgate.net/publication/236132848, Jan. 2012, 14 pages.
Foreign Communication From a Counterpart Application, PCT Application No. PCT/CN2018/087948, English Translation of International Search Report dated Jul. 30, 2018, 4 pages.

* cited by examiner

BALANCING CPU UTILIZATION IN A MASSIVELY PARALLEL PROCESSING HETEROGENEOUS CLUSTER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some computing systems employ clusters of computers to perform a task. Using a load balancer, a workload to be performed by the cluster may be split among the various computers of the cluster in a coordinated fashion. By processing the workload concurrently among multiple computers, the workload is completed more quickly than if a single computer was used to execute the same workload. Various techniques can be employed by the load balancer to divide the workload among the various computers of the cluster such as a round robin distribution, a hashing distribution, etc.

SUMMARY

According to one aspect of the present disclosure, there is provided a system that includes a processor coupled to memory. The memory includes instructions that upon execution cause the processor to perform various operations. For example, the processor may determine a performance metric ratio of a performance metric of a second type of server relative to a performance metric of a first type of server for each of a first plurality of sizes of each of a plurality of benchmark datasets to thereby determine a plurality of performance metric ratio values. The processor also may determine an interpolation function for the plurality of performance metric ratio values usable to compute interpolation performance metric ratios of the second type of server relative to the first type of server for dataset sizes other than the first plurality of sizes. Further, given a second dataset and for each of the first and second types of servers, the processor may determine an amount of the second dataset to provide to each of the respective types of servers using the interpolation function. The processor then may generate a signal to configure a load distribution function of a load balancer based on the amount of the second dataset determined for each type of server.

Optionally, in any of the preceding aspects, another implementation of the aspect provides that the determined interpolation function is a cubic spline interpolation function.

Optionally, in any of the preceding aspects, the memory's instructions also cause the processor to compute a performance metric from each server of each of the first and second types using a dataset different than any of the plurality of benchmark datasets and to generate a second signal to reconfigure the load balancer based on the computed performance metrics.

Optionally, in any of the preceding aspects, the memory's instructions also cause the processor to compute an average central processing unit (CPU) utilization for the first and second server types, compute a CPU utilization range based on differences between the CPU utilization for each server type and the average CPU utilization, determine that at least one of the server types has a CPU utilization outside the computed range, and again determine the amount of the second dataset to provide to each of the respective types of servers through execution of a recursive function including the interpolation function and a ratio of the CPU utilization of each server type to the average.

Optionally, in any of the preceding aspects, the memory's instructions also cause the processor to determine the amount of the second dataset to provide to each of the respective types of servers through execution of a recursive function including the interpolation function.

Optionally, in any of the preceding aspects, the memory's instructions also cause the processor to weight the plurality of performance metric ratio values.

Optionally, in any of the preceding aspects, the memory's instructions also cause the processor to determine a performance metric ratio of a performance metric of a third type of server relative to the performance metric of the first type of server and to determine an interpolation function for the third type of server.

Optionally, in any of the preceding aspects, the performance metrics comprise central processing unit (CPU) utilizations.

Optionally, in any of the preceding aspects, the first and second types of servers differ as for at least one of: amount of memory, memory access speed, CPU speed, and number of CPUs.

According to another aspect of the present disclosure, there is provided a system that includes a system that includes a processor and memory. The memory includes instructions that upon execution cause the processor to perform various operations. For example, the processor may obtain a computer performance metric value from each of a plurality of servers, each server being of a type, wherein the plurality of servers comprises servers of at least two different types. Further, given a dataset and for each of the types of servers, the processor may determine an amount of the dataset to provide to each of the respective types of servers based on various factors. One factor may comprise a set of performance metric ratios where each ratio corresponds to a relative performance metric of one of the types of servers to a performance metric of another of the types of servers. Another factor may include an interpolation function for the set of performance metric ratios. The processor then may generate a signal to reconfigure a load distribution function of a load balancer based on the amount of the dataset determined to be provided to each of the respective types of servers.

Optionally, in any of the preceding aspects, the memory's instructions also cause the processor to determine the amount of the dataset to provide to each of the respective types of servers also based on a plurality of ratios, each ratio being for a given server type and comprising an average of the obtained computer performance metrics to the obtained computer performance metric for the given server type.

Optionally, in any of the preceding aspects, the memory's instructions also cause the processor to determine the amount of the dataset to provide to each of the respective types of servers also through execution of a recursive function.

Optionally, in any of the preceding aspects, the load distribution function comprises at least one of a hashing distribution function, a random distribution, a round robin, and a distribution by rang with adjustment function.

Optionally, in any of the preceding aspects, the memory's instructions also cause the processor to compute a target range of performance metrics based on an average computer performance metric for all of the server types and determine whether the computer performance metric values for each type of server is within the target range.

Optionally, in any of the preceding aspects, the performance metrics comprise at least one of central processing unit (CPU) utilizations and server response time.

According to yet another aspect of the present disclosure, there is provided a method that includes computing a performance metric ratio of a performance metric of a second type of server relative to a performance metric of a first type of server for each of a first plurality of sizes of each of a plurality of datasets to thereby compute a plurality of performance metric ratio values. The method also may include computing an interpolation function for the plurality of performance metric ratio values usable to compute interpolation performance metric ratios of the second type of server relative to the first type of server for dataset sizes other than the first plurality of sizes. Given a second dataset and for each of the first and second types of servers, the method may include computing an amount of the second dataset to provide to each of the respective types of servers using the interpolation function. The method may also include configuring a load distribution function of a load balancer based on the amount of the second dataset determined for each type of server.

Optionally, in any of the preceding aspects, the performance metrics comprise central processing unit (CPU) utilizations.

Optionally, in any of the preceding aspects, the datasets comprise benchmark datasets.

Optionally, in any of the preceding aspects, computing the interpolation function comprises computing a cubic spline interpolation function.

Optionally, in any of the preceding aspects, the method further includes weighting the plurality of performance metric ratio values.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
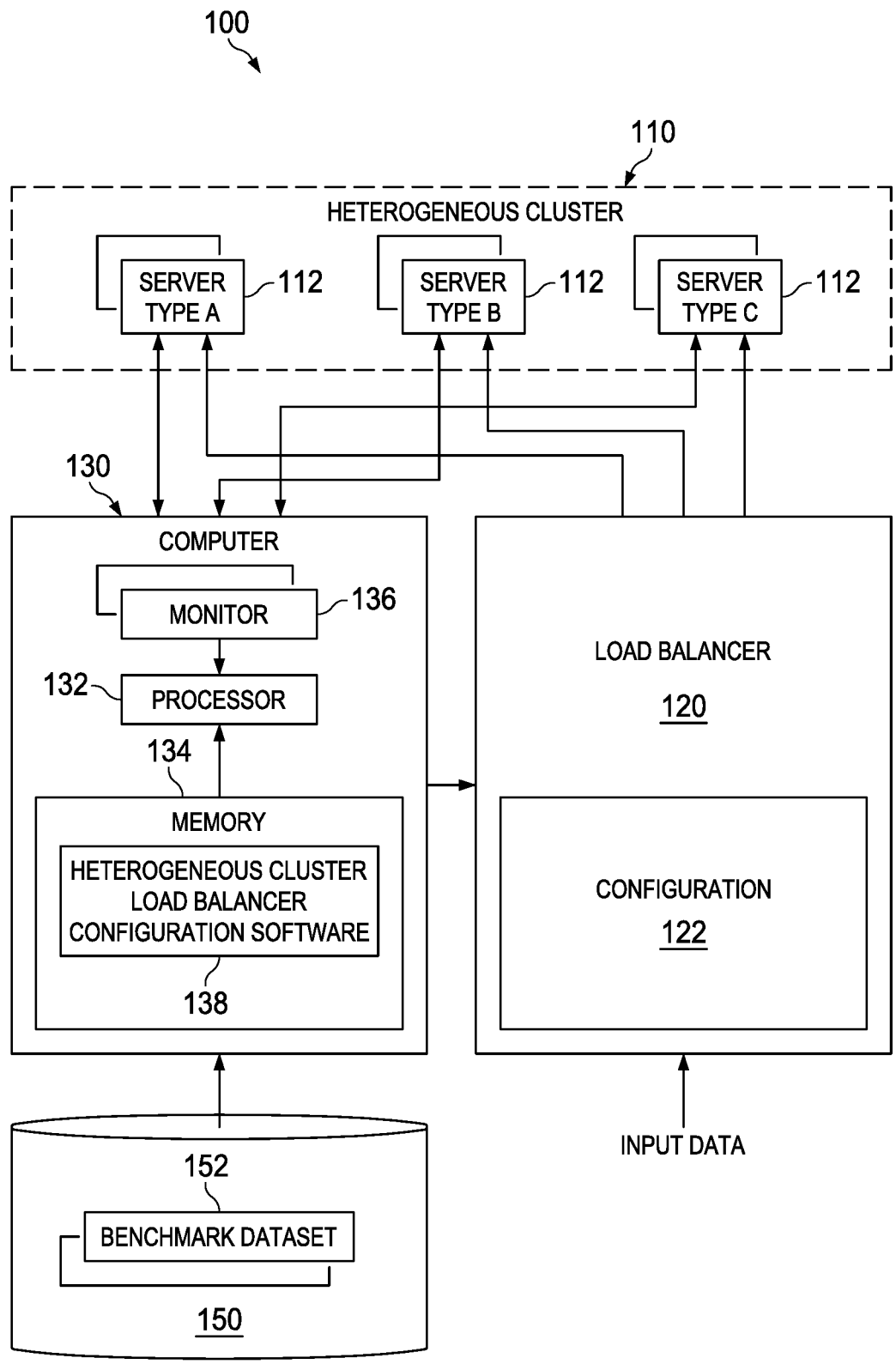
FIG. 1 is a schematic diagram of a system including a configurable load balancer in accordance with various embodiments.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is data distribution method to balance server resource utilization and to improve system performance. As will be more fully explained below, the method permits all servers to achieve similar processor utilization and thus performance of the entire processing system is improved. Some clusters of servers may comprise servers of different performance capabilities. The present disclosure determines the relative performance capabilities of the servers and configures a load balancer based on the determined relative performance capabilities of the servers. As a result, use of the servers by the load balancer may be more efficient than if the relative performance capabilities are not considered.

Load balancers may be used to distribute incoming requests to a cluster of server computers ("servers"). The requests are application-specific and may comprise, for example, database requests (e.g., search requests, update requests, requests to add records or delete records, etc.). The functionality implemented by the requests may be other than database requests in other embodiments. The load balancer selects one of the servers in the cluster and forwards the request to the particular server for processing by the server. By distributing the incoming requests (sometimes referred to as the "load") across the various servers, the requests can be completed concurrently and thus in less time than if all requests were handled by a single server. Often, the backend servers used to process the requests from the load balancer are all of the same type. Reference to server "type" herein refers to any one or more of the number of central processing units (CPUs) in the processor, the operating speed of the CPUs, the amount of memory, the access time of the memory, and other factors that affect server performance.

However, some systems may have a mix of servers of varying types. For example, a number of servers of the same type may be set up initially to form a cluster. After a period of time, the operator of the cluster may add additional servers to the cluster that may be of a different type (e.g., upgraded servers) than the original servers. Subsequently, one or more of the original servers may be retired and replaced with yet a third type of server. Over time as the cluster of servers is maintained (servers retired, added, replaced, etc.), the cluster of servers may include servers of varying types and thus include servers of varying performance capabilities. A cluster of more than one type of servers is referred to herein as a heterogeneous cluster. Some types of servers are able to process more data per unit of time than other types of servers. In accordance with the disclosed embodiments, performance testing is conducted on the heterogeneous cluster using one or more benchmark datasets of varying sizes of data. Performance metrics for each type of server within the cluster are measured or otherwise obtained and compared to a baseline type of server. The performance metrics may comprise CPU utilization, response time, and/or other metrics of how well a server performs for a given workload. The performance metrics may indicate that some types of servers perform at a higher level (e.g., faster response time, lower CPU utilization, etc.) than other types of servers. The baseline type of server to which the other types of servers are compared may be the server whose performance metrics indicate least favorable performance within the cluster. For example, the baseline server may be the server type whose CPU utilization is highest for processing the baseline datasets as compared to the other server types.

The ratios of the performance metrics of the various types of servers to the baseline server type are computed across different types of benchmark datasets and varying sizes of each type of benchmark dataset. The disclosed embodiments also may compute an interpolation function from the ratios. The interpolation function can be used to determine the relative performance metrics for the various types of servers for a dataset size that was not included in the benchmark datasets used to compute the initial set of performance metric ratios. The performance metric ratios and the interpolation function then can be used to compute the amount of a given size of data that should be distributed to each of the types of servers of the cluster so that all servers in the cluster will nominally complete their execution of the data (which may comprise database requests or other types of requests) at approximately the same time. For example, a faster server may be given a larger amount of data to process compared to a slower server, but both servers will take approximately the same amount of time to process their respective loads. The amount of data to be assigned to each type of server to achieve concurrent workload completion is determined as noted above and described in detail below. The load balance then can be configured so as to distribute more load to servers that have a higher performance capability than other servers.

FIG. 1 illustrates a diagram of a system 100 that comprises a cluster 110 of servers 112, a load balancer 120, a computer 130, and a data store 150. The servers 112 comprising the cluster 110 may comprise servers of varying types such as Server Type A, Server Type B, and Server Type C as illustrated in the example of FIG. 1. The cluster 110 may include any number (one or more) of server types. Further, the cluster 110 may comprise any number (one or more) of servers of a given type, and the number of servers of one type may be different than the number of servers of another type. That is, two (or more) different types of servers may have the same number of servers of each type, while another two (or more) different types of servers have different numbers of servers. In this example, references to a "server" may refer to a physical server executing requests submitted by the load balancer 120, or a virtual machine instance executing on a physical server.

The load balancer 120 may comprise a network device (e.g., a server) that receives input data and distributes the input data to the various servers 112 of the cluster. The load balancer 120 may employ any of a variety of distribution techniques such as random distribution, round robin distribution, and distribution by rang with adjustment. Additional distribution techniques are possible as well.

The computer 130 (which may include multiple computers configured to perform the functionality described herein) comprises one or more processors 132 coupled to memory 134. Memory 134 may comprise random access memory or other types of non-transitory storage devices including hard disk drives, solid state storage drives, etc. The memory 134 stores heterogeneous cluster load balancer configuration software 138. The heterogeneous cluster load balancer configuration software 138 comprises machine instructions which are executable by processor 132. Upon execution by the processor 132, the machine instructions perform the various operations described herein.

The computer 130 also may include one or more monitor agents 136, which may comprise software or hardware implemented monitors. A monitor agent 136 may be initialized and configured to measure, obtain, and/or record a particular performance metric of the servers 112 such as CPU utilization, server response time, etc. The processor 132 may initialize a separate monitor agent 136 for each server 112 in the cluster 110, each server type within the cluster 110, or based on some other demarcation. Each monitor agent 136 may record the timestamp that a request is submitted to a server and the timestamp of a response message—the difference in timestamps representing the elapsed response time. Additionally or alternatively, a monitor agent 136 may interrogate a server 112 for its CPU utilization value, which the server 112 otherwise monitors itself.

The data store 150 stores one or more benchmark datasets 152. A benchmark dataset 152 may comprise an industry standard dataset usable to determine the performance level of a server in a controlled, standardized fashion. Benchmark datasets 152 may comprise a suite of business oriented ad-hoc queries and concurrent data modifications. Examples of benchmark datasets 152 comprise datasets from The TPC, which is a non-profit corporation founded to define transaction processing and database benchmarks, such as TPC-H, TPC-DSA, etc. Benchmark datasets 152 also may include non-industry standard datasets and may be customized on an application-specific basis. A scale factor can be specified for a given benchmark dataset. The scale factors may correspond to dataset sets. In one example, the scale factors may correspond to dataset sizes of 1 gigabyte (GB), 10 GB, 100 GB, 1 terabyte (TB), and 10 TB.

FIG. 1 shows an example cluster 110 containing three types of servers 112. The monitor agents 136 can measure, determine or otherwise obtain a performance metric for each server and the processor 132 can compute the ratio of one server's performance metric to another server's performance metric for the same type and size of dataset being processed. For example, a first benchmark dataset of a particular size is provided to and processed by each of the three types of servers. The response time or average CPU utilization rate of each of the three types of servers (in the example of FIG. 1) as a result of processing the benchmark dataset is determined. The ratio of the performance metric of each of the two highest performing servers to the lowest performing server is computed and is referred to herein as the Ratio of Computational Capability (RCC). Assuming that the server types are designated as M1, M2, M3, etc., the RCC can be expressed as:

$$RCC_{ijk}(M_i, W_j, S_k) = TS(M_i, W_j, S_k)/TS(M1, W, S) \quad (1)$$

where "i" is an index for the server type, "j" is an index for the benchmark dataset (e.g., TPC-H, TPC-DS, customized dataset, etc.), "k" is an index of the scale factor S (e.g., 1 GB, 10 GB, etc.), and W refers to workload (e.g., dataset).

A matrix thus can be created for a given server of the various RCC values determined across different benchmark datasets and different sizes for each dataset. An example of such a matrix is provided below:

$$RCC_i = \begin{bmatrix} r_{11} & r_{12} & r_{13} & r_{14} & r_{15} \\ r_{21} & r_{22} & r_{23} & r_{24} & r_{25} \\ r_{31} & r_{32} & r_{33} & r_{34} & r_{35} \end{bmatrix}$$

Each "r" value in the matrix represents the ratio of the performance metric of server "i" to the baseline server. Each row corresponds to a different benchmark dataset 152, and within a given row the five r values correspond to five different scale factors for that benchmark dataset.

In some applications, different benchmark datasets may be weighted differently for various reasons. For example, one particular benchmark dataset may be deemed to be closer to the actual data processing needs of a user than another benchmark dataset and thus the former benchmark dataset may be weighted more than other benchmark datasets. A weight factor matrix may be defined for each benchmark dataset as:

$$F_k[\ ] = \{f_1, f_2 \ldots f_n\}, \quad (2)$$

where $\Sigma_{j=1}^n f_j = 1$, and n is the number of benchmark datasets

As desired, the weight factor matrix may be multiplied by the RCC matrix. An interpolation function then can be generated for the resulting set of RCC (possibly weighted) values for different dataset sizes. Thus, if a user of the cluster 110 wants to configure the load balancer 120 to accommodate a particular amount of data, the interpolation function can be used to compute the RCC values for the servers for the target dataset size, where, an interpolation function can look like this:

$$y - y_1 = \frac{y_2 - y_1}{x_2 - x_1}(x - x_1).$$

In the equation the two sets of points, (x1, y1) and (x2, y2), are known, and the unknown set of points (x, y) is in between. If x is given, then y can be determined. In one example, the Bezier Spline (cubic) is used to compute the interpolation function. A spline is a polynomial between each pair of tabulated points. Other types of interpolation functions can be used as well.

Once the interpolation function is computed, the interpolation function can be applied to a given dataset of an arbitrary size (which may be different than the sizes of the benchmark datasets discussed above) to determine the amount of a given dataset to distribute to each type of server so that, given the varying performance characteristics of the different server types, the various servers 112 of the cluster 110 will complete their distributed portions of the given dataset approximately concurrently and thus with maximum efficiency (e.g., no one server will be idle having finished its workload long before other servers have finished their workloads). The amount of data of a dataset of size S to be assigned to each of the servers 112 can be determined through convergence of the following illustrative recursive equation:

$$S = \Sigma_{i=1}^n \left( \frac{N_i}{RCC_i\left(\frac{x}{RCC_i(x)}\right)} \right) x \quad (3)$$

where x is the value solved from the equation and represents the amount of data to be assigned to the baseline server (e.g., the lowest performing server). The amount of data to be assigned to the other servers may be calculated by processor 132 as $$\frac{x}{RCC_i},$$

that is, x divided by the RCC value for server i. For example, if the RCC value for a given server is 0.5, then that server is determined to be able to execute twice as fast for the dataset for which the RCC was computed as compared to the baseline server. Thus, for that particular server, the load balancer should assign twice as much data as to the baseline server.

Figure 2:
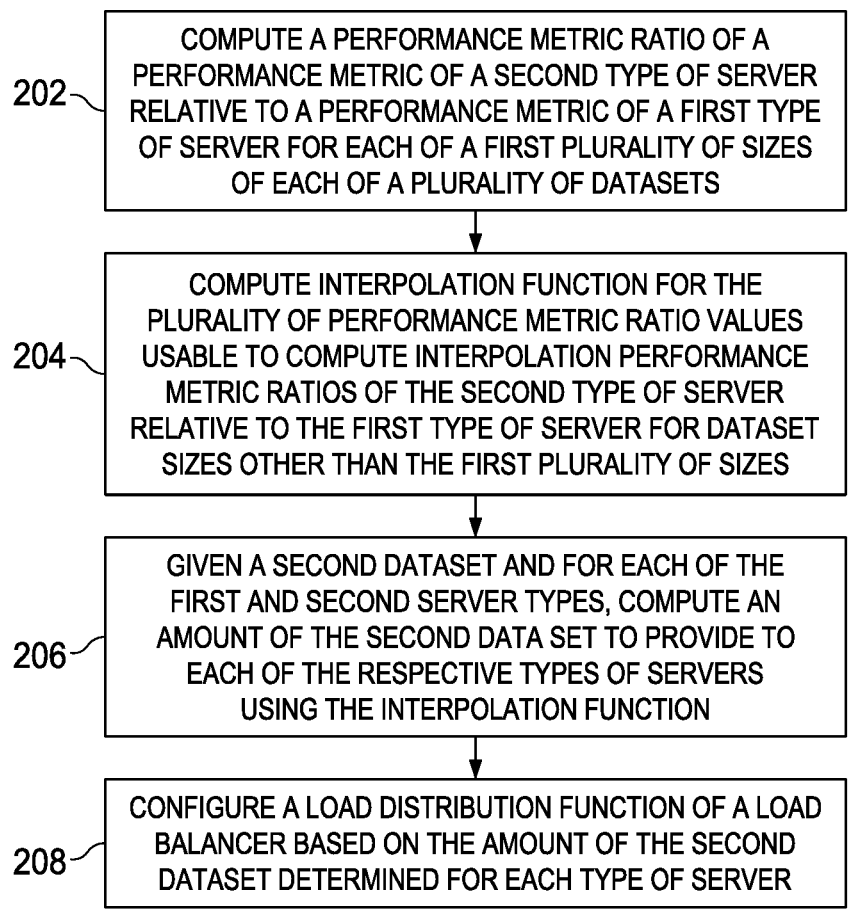
FIG. 2 is a flowchart of a method of configuring a load balancer in accordance with various embodiments.

The operation of the processor 132, upon execution of the heterogeneous cluster load balancer configuration software 138, is described with reference to the flow diagram of FIG. 2. The operations illustrated in FIG. 2 may be performed in the order shown, or in a different order. Further, the operations may be performed sequentially, or two more of the operations may be performed concurrently. The method illustrated in FIG. 2 is provided for two different types of servers but can readily be extended to any number of types of servers.

At 202, the method includes computing a performance metric ratio of a performance metric of a second type of server relative to a performance metric of a first type of server (e.g., the baseline server) for each of a first plurality of sizes of each of a plurality of datasets to thereby compute a plurality of performance metric ratio values. The matrix above is an example of such a plurality of performance metric ratio values. The performance metric may comprise CPU utilization, response time, etc. The performance metrics may be obtained from the servers by the monitor agents 136, or calculated by the monitor agents 136 based on timestamps imposed on the traffic to and from the servers 112.

At 204, the method also includes computing an interpolation function for the plurality of performance metric ratio values usable to compute interpolation performance metric ratios of the second type of server relative to the first type of server for dataset sizes other than the first plurality of sizes. A Bezier Spline interpolation may be performed in one embodiment. The interpolation permits the calculation of a server's performance metric relative to the baseline for other dataset sizes than was used at 202 and for which the interpolation function was computed.

At 206, for a second dataset and for each of the first and second types of servers, the method in this example includes computing an amount of the second dataset to provide to each of the respective types of servers using the interpolation function. An example of an equation that can be used in this regard is provided above as equation (3).

At 208, the illustrative method includes configuring a load distribution function of a load balancer 120 based on the amount of the second dataset determined for each type of server. This operation may be implemented by processor 132 of computer 130 to transmit configuration values to the load balancer 120 for storage as configuration data 122. The configuration data 122 is then used by the load balancer when making determinations as to the distribution of input data to the various servers of the heterogeneous cluster 110. In one example, the configuration data 122 may provide a weighting factor for each type of server that is used by the load distribution function of the load balancer 120. For example, if the load balance implements a random distribution of input data to the cluster, the distribution can be weighted using the configuration data 122 to favor the higher performing servers 112 over the lower performing servers (and thus deviating from a true or pseudo random distribution).

Figure 3:
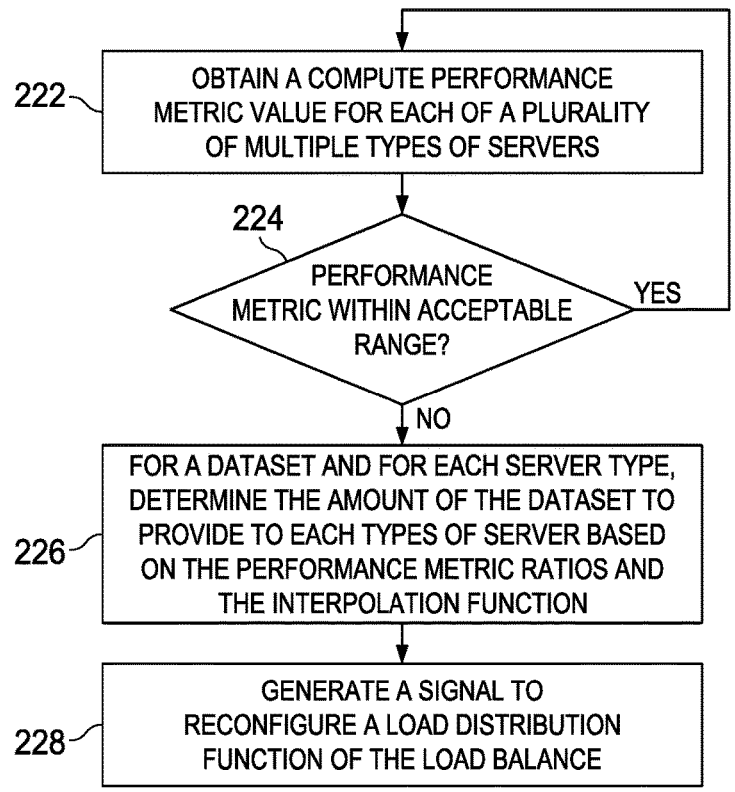
FIG. 3 is a flowchart of a method of reconfiguring a load balancer in accordance with various embodiments.

In some applications, the load performance evaluation of the servers 112 based on the benchmark datasets 152 may be performed before shipment of the servers 112 to the location at which they are to be used during runtime. The load balancer 120 may be configured before the shipment occurs as well. Once the servers 112 and load balancer 120 are installed at their destination location, additional testing can be performed to tune the load balancer based on an additional dataset specific to the user. FIG. 3 includes an illustrative flow diagram of a method for further tuning the load balancer 120 following its initial configuration per the flow diagram of FIG. 2. The execution of the heterogeneous cluster load balancer configuration software 138 by a processor 132 also may implement the operations shown in FIG. 3. The operations illustrated in FIG. 3 may be performed in the order shown, or in a different order. Further, the operations may be performed sequentially, or two more of the operations may be performed concurrently.

At 222, the method includes obtaining a computer performance metric value (e.g., CPU utilization, response time, etc.) from each of multiple servers 112. The servers have been receiving input data from the load balancer 120 and processing the input data. The performance metrics obtained at 222 thus indicate the performance level of the servers 112 after the load balancer 120 has been configured as described above.

At 224, the method includes determining whether the performance metric value for each server is within a target range. For example, if the performance metric value is CPU utilization, then in one embodiment, operation 224 is performed by computing the average of the CPU utilization values of the various servers 112 (including servers of different types). The average may be designated as $\bar{\mu}$. The target range for the performance metric values may be:

$$\text{Target Range} = \bar{\mu} \pm \frac{\sigma}{2}, \qquad (4)$$

where $$\sigma = \sqrt{\Sigma_{i=1}^{n} \frac{(\mu_i - \bar{\mu})^2}{n}}.$$

The value $\mu_i$ represents the performance metric value of server type i. If the performance metric values of all of the types of servers 112 are within the target range, then the configuration of the load balancer is not changed (the "yes" branch from operation 224). If, however, the performance metric values of any of the servers are outside the target range (the "no" branch), then control flows to operation 226.

At 226, the illustrative method includes, for a dataset (e.g., a user-supplied dataset) and for each type of servers, determining the amount of the dataset to provide to each type of server based on the performance metric ratios and the interpolation function described above. This determination can be made, for example, by solving an equation similar to equation 3 above. An equation, which can be solved as part of operation 226, is:

$$S = \Sigma_{i=1}^{n} \left( \frac{f_i N_i}{RCC_i\left(\frac{x'}{RCC_i(x')}\right)} \right) x' \qquad (3)$$

where $f_i = \bar{\mu}/\mu_i$ and x' is the amount of data to be assigned to the baseline (e.g., slowest) server 112. In a similar manner as noted above, the amount of data to provide to the other servers is $$\frac{x'}{RCC_i}.$$

The amount of data determined that should be provided to the individual types of servers is based on the set of performance metric ratios, where each ratio corresponds to a relative performance metric of one of the types of servers to a performance metric of another of the types of servers, as well as based on the interpolation function for the set of performance metric ratios.

At 228, the method includes generating a signal to reconfigure the load distribution function of the load balancer based on the amount of the dataset determined to be provided to each of the respective types of servers.

Figure 4:
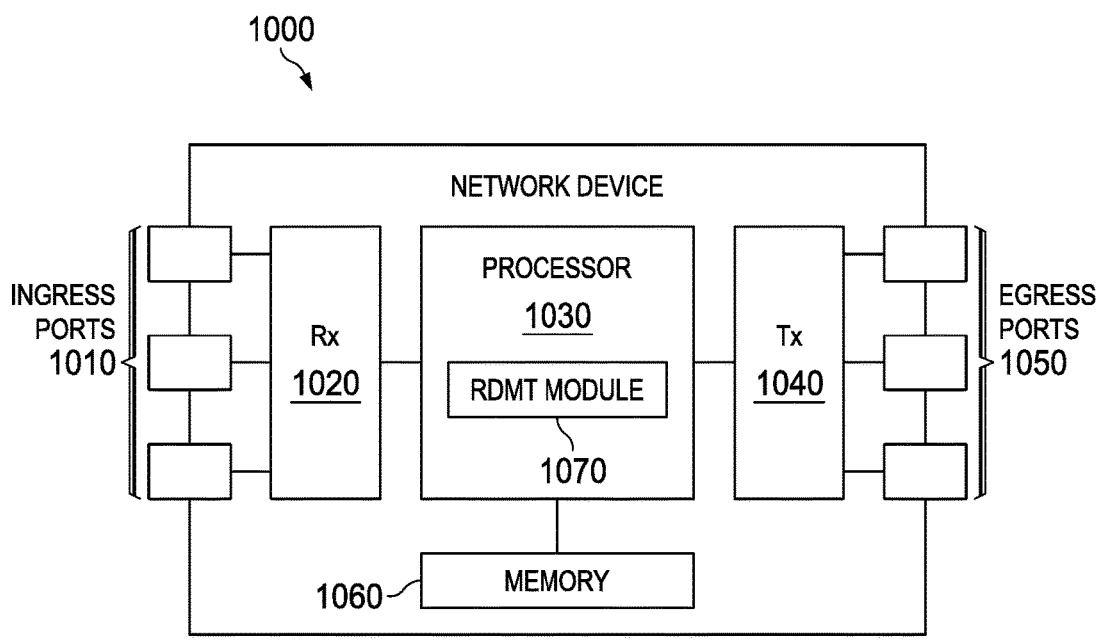
FIG. 4 is a schematic diagram of a device in accordance with various embodiments.

FIG. 4 is a schematic diagram of a network device 1000 according to an embodiment of the disclosure. The device 1000 is suitable for implementing the disclosed embodiments as described below. The device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060. The processor 1030 comprises a load balancing module 1070. The load balancing module 1070 implements the disclosed embodiments described above. For instance, the load balancing module 1070 implements the heterogeneous cluster load balancer configuration software 138. The inclusion of the load balancing module 1070 therefore provides a substantial improvement to the functionality of the device 1000 and effects a transformation of the device 1000 to a different state. Alternatively, the load balancing module 1070 is implemented as instructions stored in the memory 1060 and executed by the processor 1030.

The memory 1060 comprises one or more disks, tape drives, and solid-state drives and may be used as an overflow data storage device, to store programs when such programs are selected for execution, and to store instructions and data that are read during program execution. The memory 1060 may be volatile and non-volatile and may be read-only memory (ROM), random-access memory (RAM), ternary content-addressable memory (TCAM), and static random-access memory (SRAM).

In an embodiment, the present disclosure provides a system including processing means coupled to memory means. The memory means includes instructions that upon execution cause the processing means to: determine a performance metric ratio of a performance metric of a second type of server relative to a performance metric of a first type of server for each of a first plurality of sizes of each of a plurality of benchmark datasets to thereby determine a plurality of performance metric ratio values; determine an interpolation function for the plurality of performance metric ratio values usable to compute interpolation performance metric ratios of the second type of server relative to the first type of server for dataset sizes other than the first plurality of sizes; given a second dataset and for each of the first and second types of servers, determine an amount of the second dataset to provide to each of the respective types of servers using the interpolation function; and generate a signal to configure a load distribution function of a load balancer based on the amount of the second dataset determined for each type of server.

In an embodiment, the present disclosure provides a system including processing means coupled to memory means. The memory means includes instructions that upon execution cause the processor to: obtain a computer performance metric value from each of a plurality of servers, each server being of a type, wherein the plurality of servers comprises servers of at least two different types; given a dataset and for each of the types of servers, determine an amount of the dataset to provide to each of the respective types of servers based on: a set of performance metric ratios, each ratio corresponding to a relative performance metric of one of the types of servers to a performance metric of another of the types of servers; and an interpolation function for the set of performance metric ratios; and generate a signal to reconfigure a load distribution function of a load balancer based on the amount of the dataset determined to be provided to each of the respective types of servers.

In an embodiment, the present disclosure provides a method implemented by means for computing a performance metric ratio of a performance metric of a second type of server relative to a performance metric of a first type of server for each of a first plurality of sizes of each of a plurality of datasets to thereby compute a plurality of performance metric ratio values; means for computing an interpolation function for the plurality of performance metric ratio values usable to compute interpolation performance metric ratios of the second type of server relative to the first type of server for dataset sizes other than the first plurality of sizes; given a second dataset and for each of the first and second types of servers, means for computing an amount of the second dataset to provide to each of the respective types of servers using the interpolation function; and means for configuring a load distribution function of a load balancer based on the amount of the second dataset determined for each type of server.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system, comprising:
    a processor;
    a memory coupled to the processor, wherein the memory includes instructions that upon execution cause the processor to:
        determine a performance metric ratio of a performance metric of a second type of server relative to a performance metric of a first type of server for each of a first plurality of sizes of each of a plurality of benchmark datasets to generate a matrix containing a plurality of performance metric ratio values;
        determine an interpolation function for the plurality of performance metric ratio values in the matrix, the interpolation function usable to compute interpolation performance metric ratios of the second type of server relative to the first type of server for dataset sizes other than the first plurality of sizes;
        given a second dataset and for each of the first and second types of servers, determine an amount of the second dataset to provide to each of the respective types of servers using the interpolation function; and
        generate a signal to configure a load distribution function of a load balancer based on the amount of the second dataset determined for each type of server.

2. The system of claim 1, wherein the interpolation function determined is a cubic spline interpolation function.

3. The system of claim 1, wherein the memory further includes instructions that, upon execution, cause the processor to, after generation of the signal to configure the load distribution function of the load balancer:
    compute a performance metric from each server of each of the first and second types using a dataset different than any of the plurality of benchmark datasets; and
    generate a second signal to reconfigure the load balancer based on the performance metrics computed.

4. The system of claim 3, wherein the memory further includes instructions that, upon execution, cause the processor to:
    compute an average central processing unit (CPU) utilization for the first and second server types;
    compute a CPU utilization range based on differences between a CPU utilization for each server type and the average CPU utilization;
    determine that the CPU utilization of at least one of the server types is outside the CPU utilization range computed; and
    again determine the amount of the second dataset to provide to each of the respective types of servers through execution of a recursive function including the interpolation function and a ratio of the CPU utilization of each server type to the average CPU utilization.

5. The system of claim 1, wherein the memory further includes instructions that, upon execution, cause the processor to determine the amount of the second dataset to provide to each of the respective types of servers through execution of a recursive function including the interpolation function.

6. The system of claim 1, wherein the memory further includes instructions that, upon execution, cause the processor to weight the plurality of performance metric ratio values.

7. The system of claim 1, wherein the memory further includes instructions that, upon execution, cause the processor to:
    determine a performance metric ratio of a performance metric of a third type of server relative to the performance metric of the first type of server; and
    determine an interpolation function for the third type of server.

8. The system of claim 1, wherein the performance metrics comprise central processing unit (CPU) utilizations.

9. The system of claim 1, wherein the first and second types of servers differ as for at least one of: amount of memory, memory access speed, CPU speed, and number of CPUs.

10. A system, comprising:
    a processor;
    a memory coupled to the processor, wherein the memory includes instructions that upon execution cause the processor to:
        obtain a computer performance metric value from each of a plurality of servers, each server being of a type, wherein the plurality of servers comprises servers of at least two different types;
        given a dataset and for each of the types of servers, determine an amount of the dataset to provide to each of the respective types of servers based on:
            a matrix of performance metric ratios, each ratio corresponding to a relative performance metric of one of the types of servers to a performance metric of another of the types of servers for a plurality of benchmark datasets of different sizes; and
            an interpolation function for the set of performance metric ratios; and
        generate a signal to reconfigure a load distribution function of a load balancer based on the amount of the dataset determined to be provided to each of the respective types of servers.

11. The system of claim 10, wherein the memory further includes instructions that, upon execution, cause the processor to determine the amount of the dataset to provide to each of the respective types of servers also based on a plurality of ratios, each ratio being for a given server type and comprising an average of the obtained computer performance metrics to the obtained computer performance metric for the given server type.

12. The system of claim 10, wherein the memory further includes instructions that, upon execution cause, the processor to determine the amount of the dataset to provide to each of the respective types of servers also through execution of a recursive function.

13. The system of claim 10, wherein the load distribution function comprises at least one of a hashing distribution function, a random distribution, a round robin, and a distribution by range with adjustment function.

14. The system of claim 10, wherein the memory further includes instructions that, upon execution cause, the processor to compute a target range of performance metrics based on an average computer performance metric for all of the server types and determine whether the computer performance metric values for each type of server is within the target range.

15. The system of claim 10, wherein the performance metrics comprise at least one of central processing unit (CPU) utilizations and server response time.

16. A method, comprising:
    computing a performance metric ratio of a performance metric of a second type of server relative to a performance metric of a first type of server for each of a first plurality of sizes of each of a plurality of datasets to thereby compute a matrix containing a plurality of performance metric ratio values;
    computing an interpolation function for the plurality of performance metric ratio values in the matrix, the interpolation function usable to compute interpolation performance metric ratios of the second type of server relative to the first type of server for dataset sizes other than the first plurality of sizes;
    given a second dataset and for each of the first and second types of servers, computing an amount of the second dataset to provide to each of the respective types of servers using the interpolation function; and
    configuring a load distribution function of a load balancer based on the amount of the second dataset determined for each type of server.

17. The method of claim 16, wherein the performance metrics comprise central processing unit (CPU) utilizations.

18. The method of claim 16, wherein the datasets comprise benchmark datasets.

19. The method of claim 16, wherein computing the interpolation function comprises computing a cubic spline interpolation function.

20. The method of claim 16, further comprising weighting the plurality of performance metric ratio values.

* * * * *